United States Patent [19]
Cook et al.

[11] Patent Number: 5,216,078
[45] Date of Patent: Jun. 1, 1993

[54] ISOCYANATE-CROSSLINKED COATING HAVING REDUCED YELLOWING

[75] Inventors: Vincent C. Cook, Southfield; Thomas R. Brunsch, Livonia, both of Mich.

[73] Assignee: BASF Corporation, Southfield, Mich.

[21] Appl. No.: 921,545

[22] Filed: Sep. 29, 1992

[51] Int. Cl.$^5$ .............................................. C08L 75/00
[52] U.S. Cl. .................................. 525/124; 525/440; 528/45
[58] Field of Search ................... 525/124, 440; 528/45

[56] References Cited

U.S. PATENT DOCUMENTS

| | | | |
|---|---|---|---|
| 4,335,029 | 6/1982 | Dabi et al. | 824/589 |
| 4,369,301 | 1/1983 | Konig et al. | 528/45 |
| 4,446,293 | 5/1984 | Konig et al. | 528/45 |
| 5,112,931 | 5/1992 | Potter et al. | 528/45 |

FOREIGN PATENT DOCUMENTS

| | | |
|---|---|---|
| 1049029 | 6/1964 | Fed. Rep. of Germany . |
| 2107338A | 4/1983 | United Kingdom . |

OTHER PUBLICATIONS

Vincent C. Cook (Environmental Etch Resistant, Two-Component Coating Composition, Method of Coating Therewith, and Coating Obtained).

Briggs et al. (Coating Method For One-Component Blocked Isocyanate-Crosslinked Clearcoat) Filing Date Dec. 20, 1991.

Cook et al. (Environment Etch Resistant, One-Component Coating Composition Containing Blocked Isocyanates Method of Coating and Coating Obtained Thereof.

*Primary Examiner*—Maurice J. Welsh
*Attorney, Agent, or Firm*—Paul L. Marshall

[57] ABSTRACT

A coating composition is described for producing a clear or colorless coating. The composition comprises:
(a) a polymer comprising at least one functional group that is reactive with isocyanate,
(b) a blocked polyisocyanate,
(c) a hydrazide group, either attached to the polymer (a), to the polyisocyanate (b), or part of a compound different from (a) or (b), wherein at least one of the nitrogens of the hydrazide group is not adjacent to a carbonyl.

33 Claims, No Drawings

ISOCYANATE-CROSSLINKED COATING HAVING REDUCED YELLOWING

FIELD OF THE INVENTION

This invention relates to polymeric coatings to a method of producing a coating having a clearcoat layer that utilizes a blocked isocyanate crosslinking agent.

BACKGROUND OF THE INVENTION

The most frequently used methods today of producing clearcoats for automotive and other coatings applications involve application of the clearcoat composition over a high-solids basecoat. The basecoat is usually composed of one or more hydroxy-functional polymers and an aminoplast crosslinking agent. Curing of the high-solids basecoat generally requires the presence of a strong acid catalyst (e.g., p-toluenesulfonic acid, dinonylnaphthalenedisulfonic acid, dodecylbenzenesulfonic acid, phenyl acidphosphate).

Clearcoat compositions can be characterized as being of the one-component type or the two-component type. In the two-component or "two-pack" system, the polymer and the cross-linking agent are combined just prior to coating. The two-component system allows for the use of highly reactive cross-linking agents, which can provide advantageous physical properties to the coating. However, the process usually requires mixing of the components in the right proportion immediately prior to coating, and can be expensive to operate and difficult to control. The one-component or "one-pack" systems offer significant advantages in manufacturability because the cross-linkable clearcoat coating composition can be coated as one formulation. However, when highly reactive crosslinking agents such as polyisocyanates are used, the cross-linking agent in one-component systems must be blocked in order to prevent premature cross-linking of the clearcoat composition. The blocking group can then be unblocked under specified conditions, such as high heat, to allow the materials to crosslink so the coating can be cured. The most resins (e.g., melamine formaldehyde resin) and isocyanates (e.g., oxime-blocked isophorone diisocyanate).

Clearcoats that have been cross-linked with aminoplast cross-linking agents exhibit good clarity and hardness; however, they suffer from a phenomenon known as environmental etch. Environmental etch appears as milky or cloudy marks on clearcoat finishes that have been exposed to the elements. Clearcoats that have been cross-linked with blocked isocyanate cross-linking agents also exhibit good hardness, and they are resistant to environmental etch. However, they suffer from severe yellowing during heat curing Unlike coatings derived from unblocked isocyanates, where yellowing is primarily limited to aromatic polyisocyanates, coatings derived from blocked isocyanates exhibit significant yellowing during cure even when an aliphatic polyisocyanate is used.

The use of hydrazide compounds having structural units according to the formula:

—CO—NH—NH—CO— reduce yellowing in two-component polyurethane coatings utilizing unblocked polyisocyanates has been described in U.S. Pat. No. 4,369,301. These compounds have also been used in one-pack acrylic coatings utilizing blocked polyisocyanate curing agents, as described in U.S. Pat. No. 5,112,931. This patent alleges that the use of such structures provides the coating with a flat finish. One compound containing the above structure is phthalhydrazide, which has the structure:

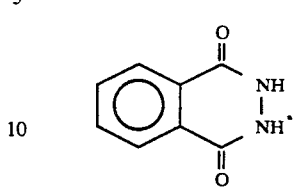

However, when phthalhydrazide is used in one-component systems with blocked polyisocyanates, it has little effect on reducing yellowing.

It is thus an object of this invention to provide a colorless or clear coating utilizing a one-component clearcoat that has the environmental etch resistance provided by blocked isocyanate cross-linking agents, but with reduced yellowing.

SUMMARY OF THE INVENTION

According to the present invention, there is provided a coating composition for producing a clear or colorless coating, comprising:
  (a) a polymer comprising at least one functional group that is reactive with isocyanate,
  (b) a blocked polyisocyanate,
  (c) a hydrazide group, either attached to the polymer (a), to the polyisocyanate (b), or part of a compound different from (a) or (b), wherein at least one of the nitrogens of the hydrazide group is not adjacent to a carbonyl.

Another embodiment of the invention relates to a method of preparing a coating where the above composition is applied to a substrate and cured at a temperature of at least 141° C.

Coatings utilizing the above composition provide god physical properties such as hardness, good resistance to environmental etch, and low yellowing. Such properties render the coatings ideal for use as the clearcoat of a color-plus-clear composite coating, as is often utilized in the field of automotive coatings.

DESCRIPTION OF THE PREFERRED EMBODIMENTS

The composition according to the present invention comprises a polymer having at least one functional group that is reactive with isocyanate. Such polymers include, for example, acrylic polymers, modified acrylic polymers, polyesters, polyepoxides, polycarbonates, polyurethanes, polyamides, polyimides, and polysiloxanes, all of which are well-known in the art. Preferably, the polymer is an acrylic, modified acrylic or polyester. More preferably, the polymer is an acrylic polymer. The above polymers may have any of a number of known functional groups that are reactive with isocyanate. Such groups include, for example, hydroxyl groups, amino groups, thiol groups, and hydrazide groups.

In one preferred embodiment of the invention, the polymer is an acrylic. Such polymers are well-known in the art, and can be prepared from monomers such as methyl acrylate, acrylic acid, methacrylic acid, methyl methacrylate, butyl methacrylate, cyclohexyl methacrylate, and the like. The functional group that is reactive with isocyanate, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Aminofunctional acrylic monomers would include t-butylaminoethyl methacrylate and t-butylaminoethylacrylate. Other acrylic monomers having isocyanate-reactive functional groups in the ester portion of the monomer are also within the skill of the art.

Modified acrylics can also be used as the polymer (a) according to the invention. Such acrylics are typically polyester-modified acrylics or polyurethane-modified acrylics, as is well-known in the art. An example of one preferred polyester-modified acrylic is an acrylic polymer modified with δ-caprolactone. Such a polyester-modified acrylic is described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having hydroxyl groups, acid groups, or amino groups as isocyanate-reactive groups can also be used as the polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

The composition according to the present invention utilizes a blocked isocyanate as a curing agent for the above-described polymers Compounds suitable as the isocyanate portion of the blocked isocyanate are well-known in the art, and include toluene diisocyanates, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4''-triisocyanate, tetramethyl xylene diisocyanate, metaxylene diisocyanate, and polyisocyanates.

Groups suitable for use as the blocker portion of the blocked isocyanate are also well-known in the art, and include alcohols, lactams, oximes, malonic esters, alkylacetoacetates, triazoles, phenols and amines. Of these, oximes (e.g., acetone oxime, methylethyl ketoxime, methylamyl ketoxime, diisobutylketoxime, formaldehyde oxime) are preferred.

The blocked isocyanate is preferably present in the composition of step B) in an amount of from about 10 weight percent to about 60 weight percent, and more preferably from about 15 weight percent to about 40 weight percent.

In a preferred embodiment, the blocked isocyanate is a mixture of both an isocyanurate of isophorone diisocyanate and an isocyanurate of 1,6-hexamethylene diisocyanate, wherein the blocker portion is an oxime (e.g., acetone oxime, methylethyl ketoxime, methylamyl ketoxime), and wherein the blocked isocyanate is present in an amount of 10-50 weight percent, based on the weight of the one-component formulation. Such blocked isocyanate mixtures are described more fully in the U.S. patent application entitled "Environmental Etch Resistant One-Component Coating Composition Containing Blocked Isocyanates, Method of Coating, and Coating Obtained Therefrom", filed Jul. 14, 1992 in the names of Vincent C. Cook, James R. Eshelman, and Edward A. Guerrini.

The composition of the present invention also includes a hydrazide group. The hydrazide group may be attached either to the polymer (a), the polyisocyanate (b), or may be part of a compound different from (a) or (b).

In a preferred embodiment of the invention, the hydrazide group has the formula:

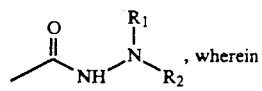, wherein $R_1$ and $R_2$ each independently represents H or substituted or unsubstituted alkyl.

Compounds containing one or more hydrazide groups are well-known in the art. They are described, for example, in C. Clark, *Hydrazine*, Matheson Chemical Corp., Baltimore, 1953, the disclosure of which is incorporated herein by reference.

In one preferred embodiment, the hydrazide group-containing compound also comprises a hindered amine group as is often found in compounds known as hindered amine light stabilizer compounds (HALS). One example of such a compound has the formula:

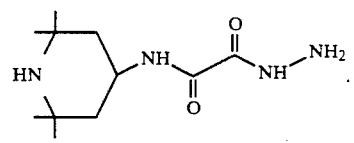

In another preferred embodiment, the hydrazide group-containing compound has the formula:

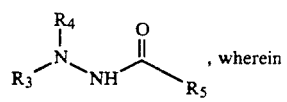, wherein $R_3$ and $R_4$ each independently represents H or substituted or unsubstituted alkyl, and $R_5$ represents substituted or unsubstituted alkyl, substituted or unsubstituted aryl, or

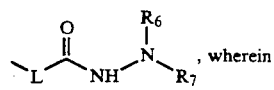, wherein

L represents a divalent linking group. The linking group is preferably aliphatic, but may also be aromatic, cycloaliphatic, or heterocyclic. Preferably, at least one of $R_3$ and $R_4$, and at least one of $R_6$ and $R_7$ represents hydrogen. In another preferred embodiment, all of $R_3$, $R_4$, $R_5$, and $R_6$ represent hydrogen.

The hydrazide group-containing compounds may be prepared from aliphatic organic acids, such as acetic acid, propionic acid, n-octanoic acid, adipic acid, oxalic acid, sebacic acid, and the like. The acid groups are typically reacted with hydrazine as is known in the art to produce the hydrazide derivative of the acid.

Examples of useful compounds different from (a) or (b) comprising hydrazide groups include:

| Compound | Formula |
|---|---|
| Hydrazides | $R(-CO-NH-NH_2)_n$ |
| Bis-hydrazides | $NH_2-NH-CO-NH-NH_2$ |
| Semicarbazides | $R-NH-CO-NH-NH_2$ |
| Thiohydrazides | $R(-CS-NH-NH_2)_n$ |
| Thiosemicarbazides | $R-NH-CS-NH-NH_2$ |

According to the above formulas for hydrazide group-containing compounds, n is a positive integer of at least 1, and R may be hydrogen (except for hydrazides or thiohydrazides when n is 1) or an organic radical. Useful organic radicals include aliphatic, cycloaliphatic, aromatic, or heterocyclic groups, preferably from 1 to 20 carbon atoms. The R groups should be free of substituents that are reactive with hydrazide groups and should be such.

Polyhydrazides (e.g., hydrazides or thiohydrazides as shown above where $n \geq 2$) can be used to incorporate hydrazide groups onto the polymer (a) or the polyisocyanate (b). This can be accomplished by reacting one of the hydrazide groups with a hydrazide-reactive group on the polymer or polyisocyanate.

In the case of the polyisocyanate (b), the isocyanate groups themselves are reactive with hydrazide. Incorporation of the hydrazide group onto the polyisocyanate can be accomplished, for example, by first reacting the polyisocyanate with an amount of polyhydrazide that will leave unreacted isocyanate groups, and then blocking the remaining unreacted isocyanate groups. This reaction is preferably performed under conditions so that no significant amount of chain extension of the polyisocyanate will occur, e.g., by blocking one or more of the hydrazide groups. Alternatively, this can be accomplished by first partially blocking the polyisocyanate, then reacting some or all of the still-active isocyanate groups with a polyhydrazide, and then blocking any remaining active isocyanate groups.

In the case of the polymer (a), a polyhydrazide can be reacted, for example with anhydride or epoxy groups on an acrylic polymer or on a polyester in order to incorporate hydrazide functionality onto the polymer. Alternatively, hydrazine can be reacted with acid groups on an acrylic polymer to form a hydrazide-functional polymer.

The present invention is especially effective at reducing yellowing when an organometallic crosslinking catalyst is used. Thus, it is a preferred embodiment of the invention that the coating composition include such a catalyst. Preferably, the catalyst is an organometallic compound or a tertiary amine compound. More preferably, the catalyst is an organometallic catalyst having tin as the metal. Examples of useful catalysts include metal acetonyl acetates, quaternary ammonium salts, zinc N-ethyl-N-phenyl dithiocarbamate, pentamethyldiethylenetriamine benzoate, cyclohexylamine acetate, n,n-dimethyl cyclohexylamine acetate, ketimines, N-methyl morpholine, tin octoate, stannic chloride, butyl tin trichloride, dibutyl tin diacetate, dibutyl tin dilaurate, bis(2-ethylhexyl) tin oxide, 1,3-diacetoxy tetrabutyl stannoxate, dibutyl dibutoxy tin, lead naphthenate, bismuth trichloride, bismuth octoate, tetrabis(2-ethylhexyl)titanate, tetrabutoxy titanium, stannous octoate, manganese, zirconium, cobalt, lead, bismuth stannate, lead stannate, zirconium octoate, tin, dibutyl tin maleate, stannous oxalate, stannous stearate, barium nitrate, zinc nitrate, dibutyltin dilauryl mercaptide, bismuth stearate, lead stearate, dimethyltin dichloride, stannous naphthate, dibutyltin bis-O-phenylphenate, dibutyltin S,S-dibutyldithio-carbonate, and triphenylantimony dichloride. Dibutyltin diacetate is a preferred catalyst.

A solvent may optionally be utilized in the one-component clearcoat formulation used in the present invention. Although the formulation of the present invention may be utilized, for example, in the form of substantially solid powder, or a dispersion, it is often desirable that the formulation used in the present invention is in a substantially liquid state, which can be accomplished with the use of a solvent. This solvent should act as a solvent with respect to both the hydroxy-functional polymer as well as the blocked isocyanate. Preferably the solvent is present in an amount effective to substantially solubilize both the hydroxy-functional polymer and the blocked isocyanate. In general, the solvent can be any organic solvent and/or water. Preferably, the solvent is a polar solvent, as polar solvents may allow the blocking agent to dissociate (i.e. deblock) at lower temperatures. More preferably, the solvent is a polar aliphatic solvents or polar aromatic solvents. Still more preferably, the solvent is a ketone, ester, acetate, aprotic amide, aprotic sulfoxide, aprotic amine, and water. Examples of useful solvents include methyl ethyl ketone, methyl isobutyl ketone, m-amyl acetate, ethylene glycol butyl ether-acetate, propylene glycol monomethyl ether acetate, xylene, n-methylpyrrolidone, and blends of aromatic hydrocarbons.

The solvent may be present in the composition of step B) in an amount of from about 0.01 weight percent to about 99 weight percent, preferably from about 10 weight percent to about 60 weight percent, and more preferably from about 30 weight percent to about 50 weight percent.

The catalyst may be present in the composition of step B) in an amount of from about 0.01 weight percent to about 10 weight percent, preferably from about 0.1 weight percent to about 2 weight percent, and more preferably about 0.5 weight percent.

The above-described coating compositions can be coated on the article by any of a number of techniques well-known in the art. These include, for example, spray coating, dip coating, roll coating, curtain coating, and the like. For automotive body panels, spray coating is preferred.

In one preferred embodiment, the clear and/or colorless coating composition according to the invention is used over a pigmented basecoat as part of a composite color-plus-clear coating. Such composite coatings are popular for their depth of color and liquid glossy surface appearance. They have found particularly wide acceptance in the field of automotive coatings.

Pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

In a preferred embodiment of the invention, the pigmented basecoat, like the clearcoat, also includes a compound comprising a hydrazide group wherein at least one of the nitrogens of the hydrazide group is not adjacent to a carbonyl.

After the article is coated with the above-described layers according to the invention, the coated article is subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 120° C. and 175° C., and are preferably between 132° C. and 157° C. The invention is particularly effective at reducing yellowing that takes place when cure temperatures exceed 141° C., and especially when cure temperatures exceed 163° C. The curing time will vary depending on the blocking agents, and physical parameters such as the thickness of the layers, however, typical curing times range from 15 to 60 minutes.

The invention is further described in the following example.

COMPARATIVE PREPARATION 1

Into a container, 37.39 parts by weight of a 65 weight percent solids hydroxy-functional acrylic polymer having a Tg of 11° C. and a hydroxyl equivalent weight of 333 g. To the same container was added the following:
6.01 parts by weight of methyl amyl ketone solvent,
6.38 parts by weight of Exxate ® 800 (Exxon Corp.) solvent,
0.20 parts by weight of Byk 306 (Byk Chemie) silane additive,
1.58 parts by weight of Tinuvin ® 384 (Ciba-Geigy Corp.) UV absorber,
0.79 parts by weight Tinuvin ® 292 (Ciba-Geigy Corp.) HALS,
19.21 parts by weight of Desmodur ® BL4165 (Miles Corp.) isocyanurate of isophorone diisocyanate,
8.57 parts by weight of Desmodur ® BL3175 (Miles Corp.), isocyanurate of hexamethylene diisocyanate,
6.45 parts by weight of Cymel ® 327 (American Cyanamid) melamine
0.26 parts by weight of dibutyltin diacetate
0.49 parts by weight of Exxate ® 1000 (Exxon Corp.) solvent, 1.00 parts by weight methanol
1.67 parts by weight of a fumed silica grind made of 9 parts fumed silica, 28 parts of the above acrylic, and 63 parts xylene.
This mixture was stirred together for 30 minutes to form a coating composition.

COMPARATIVE PREPARATION 2

Into a container, 35.25 parts by weight of a 65 weight percent solids hydroxy-functional acrylic polymer having a Tg of 11° C. and a hydroxyl equivalent weight of 333 g. To the same container was added the following:
5.78 parts by weight of methyl amyl ketone solvent,
7.44 parts by weight of Exxate ® 800 (Exxon Corp.) solvent,
0.20 parts by weight of Byk 306 (Byk Chemie) silane additive,
1.51 parts by weight of Tinuvin ® 38 (Ciba-Geigy Corp.) UV absorber,
0.76 parts by weight Tinuvin ® 292 (Ciba-Geigy Corp.) HALS,
18.47 parts by weight of Desmodur ® BL4165 (Miles Corp.) isocyanurate of isophorone diisocyanate,
8.24 parts by weight of Desmodur ® BL3175 (Miles Corp.), isocyanurate of hexamethylene diisocyanate,
6.21 parts by weight of Cymel ® 327 (American Cyanamid) melamine
0.25 parts by weight of dibutyltin diacetate
0.47 parts by weight of Exxate ® 1000 (Exxon Corp.) solvent,
0.95 parts by weight of methanol
11.22 parts by weight of a fumed silica grind made of 9 parts fumed silica, 28 parts of the above acrylic, and 63 parts xylene.
3.25 parts by weight of a phthalhydrazide grind made of 21.59 parts of the above acrylic, 28.02 parts by weight of phthalhydrazide, and 50.39 parts by weight of butyl carbitol acetate solvent.
This mixture was stirred together for 30 minutes to form a coating composition.

EXAMPLE 1

Into a container, 37.39 parts by weight of a 65 weight percent solids hydroxy-functional acrylic polymer having a Tg of 11° C. and a hydroxyl equivalent weight of 333 g. To the same container was added the following:
5.85 parts by weight of methyl amyl ketone solvent,
7.07 parts by weight of Exxate ® 800 (Exxon Corp.) solvent,
0.2 parts by weight of Byk 306 (Byk Chemie) silane additive,
1.53 parts by weight of Tinuvin ® 384 (Ciba-Geigy Corp.) UV absorber,
0.77 parts by weight of Tinuvin ® 292 (Ciba-Geigy Corp.) HALS,
18.69 parts by weight of Desmodur ® BL4165 (Miles Corp.) isocyanurate of isophorone diisocyanate,
8.34 parts by weight of Desmodur ® BL3175 (Miles Corp.), isocyanurate of hexamethylene diisocyanate,
6.28 parts by weight of Cymel ® 327 (American Cyanamid) melamine
0.26 parts by weight of dibutyltin diacetate
0.48 parts by weigh of Exxate ® 1000 (Exxon Corp.) solvent,
0.96 parts by weight methanol
11.36 parts by weight of a fumed silica grind made of 9 parts fumed silica, 28 parts of the above acrylic, and 63 parts xylene.
1.83 parts by weight of an adipic dihydrazide grind made of 21.59 parts of the above acrylic, 28.02 parts by weight of adipic dihydrazide, and 50.39 parts by weight of butyl carbitol acetate solvent.
This mixture was stirred together for 30 minutes to form a coating composition.

EXAMPLE 2

Into a container, 35.25 parts by weight of a 65 weight percent solids hydroxy-functional acrylic polymer having a Tg of 11° C. and a hydroxyl equivalent weight of 333 g. To the same container was added the following:

5.78 parts by weight of methyl amyl ketone solvent, 7.44 parts by weight of Exxate® 800 (Exxon Corp.) solvent, 0.20 parts by weight of Byk 306 (Byk Chemie) silane additive, 1.51 parts by weight of Tinuvin® 384 (Ciba-Geigy Corp.) UV absorber, 0.76 parts by weight Tinuvin® 292 (Ciba-Geigy Corp.) HALS, 18.47 parts by weight of Desmodur® BL4165 (Miles Corp.) isocyanurate of isophorone diisocyanate, 8.24 parts by weight of Desmodur® BL3175 (Miles Corp.), isocyanurate of hexamethylene diisocyanate, 6.21 parts by weight of Cymel® 327 (American Cyanamid) melamine 0.25 parts by weight of dibutyltin diacetate 0.47 parts by weight of Exxate® 1000 (Exxon Corp.) solvent, 0.95 parts by weight methanol 22 parts by weight of a fumed silica grind made of 9 parts fumed silica, 28 parts of the above acrylic, and 63 parts xylene.

3.25 parts by weight of a phthalhydrazide grind made of 21.59 parts of the above acrylic, 28.02 parts by weight of octanoic hydrazide, and 50.39 parts by weight of butyl carbitol acetate solvent.

This mixture was stirred together for 30 minutes to form a coating composition.

EXAMPLE 3

Into a container, 34.43 parts by weight of a 65 weight percent solids hydroxy-functional acrylic polymer having a Tg of 11° C. and a hydroxyl equivalent weight of 333 g. To the same container was added the following:

5.54 parts by weight of methyl amyl ketone solvent, 8.97 parts by weight of Exxate® 800 (Exxon Corp.) solvent, 0.19 parts by weight of Byk 306 (Byk Chemie) silane additive, 1.45 parts by weight of Tinuvin® 384 (Ciba-Geigy Corp.) UV absorber, 0.73 parts by weight Tinuvin® 292 (Ciba-Geigy Corp.) HALS, 17.69 parts by weight of Desmodur® BL4165 (Miles Corp.) oxime-blocked isocyanurate of isophorone diisocyanate, 7.89 parts by weight of Desmodur® BL3175 (Miles Corp.), oxime-blocked isocyanurate of hexamethylene diisocyanate, 5.94 parts by weight of Cymel® 327 (American Cyanamid) melamine 0.24 parts by weight of dibutyltin diacetate 0.45 parts by weight of Exxate® 1000 (Exxon Corp.) solvent, 0.91 parts by weight methanol 10.75 parts by weight of a fumed silica grind made of 9 parts fumed silica, 28 parts of the above acrylic, and 63 parts xylene.

4.82 parts by weight of a hydrazide grind made of 21.59 parts of the above acrylic, 50.39 parts by weight of butyl carbitol acetate solvent, and 28.02 parts by weight of Luchem® HAR100 (Atochem Corp.), a hydrazide compound having the formula:

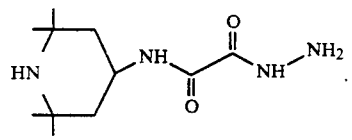

This mixture was stirred together for 30 minutes to form a coating composition.

EXAMPLE 4

The above coating compositions were sprayed onto cold rolled steel panels that had previously been coated with a white basecoat. The panels were then baked for 30 minutes at 143° C. to cure the coating. The yellowing index of each of the panels was determined according to ASTM D 1925-70. The yellowing indices are set forth below in Table I.

TABLE I

| Example | Hydrazide | Yellowing Index |
| --- | --- | --- |
| Comparison 1 | None | 9.66 |
| Comparison 2 | Phthalhydrazide | 6.48 |
| 1 | Adipic dihydrazide | 2.64 |
| 2 | Octanoic hydrazide | 4.05 |
| 3 | Luchem® HAR100 | 0.23 |

As shown in Table I, the coating compositions according to the invention produced coatings with significantly lower yellowing than the comparison coatings.

The invention has been described in detail with reference to preferred embodiments thereof. It should be understood, however, that variations and modifications can be made within the spirit and scope of the invention.

We claim:

1. A coating composition for producing a clear or colorless coating, comprising:
   (a) a polymer comprising at least one functional group that is reactive with isocyanate,
   (b) a blocked polyisocyanate,
   (c) a hydrazide group, either attached to the polymer (a), to the polyisocyanate (b), or part of a compound different from (a) or (b), wherein at least one of the nitrogens of said hydrazide group is not adjacent to a carbonyl.

2. A coating composition according to claim 1 wherein said functional group is a hydroxyl group, an amino group, a hydrazide group, or a thiol group.

3. A coating composition according to claim 1 wherein said functional group is a hydroxyl group.

4. A coating composition according to claim 3 wherein said polymer is an acrylic, modified acrylic, or polyester.

5. A coating composition according to claim 1 wherein said polymer is an acrylic, modified acrylic, or polyester.

6. A coating composition according to claim 1 wherein said hydrazide group has the formula:

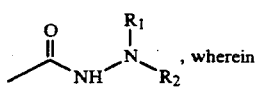, wherein $R_1$ and $R_2$ each independently represents H or substituted or unsubstituted alkyl.

7. A coating composition according to claim 6 wherein at least one of $R_1$ and $R_2$ represents H.

8. A coating composition according to claim 6 wherein both of $R_1$ and $R_2$ represent H.

9. A coating composition according to claim 1 wherein the hydrazide group is attached to the polymer (a).

10. A coating composition according o claim 1 wherein the hydrazide group is part of a compound different from the polymer (a) and the polyisocyanate (b).

11. A coating composition according to claim 10 wherein the compound comprising the hydrazide group is an aliphatic acid hydrazide compound.

12. A coating composition according to claim 10 wherein the compound comprising the hydrazide group is represented by the formula:

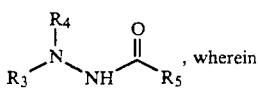, wherein $R_3$ and $R_4$ each independently represents H or substituted or unsubstituted alkyl, and $R_5$ represents substituted or unsubstituted alkyl, substituted or unsubstituted aryl, or

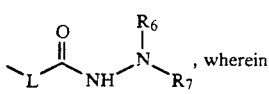, wherein

L represents a divalent linking group.

13. A coating composition according to claim 12 wherein at least one of $R_3$ and $R_4$ represents H and at least one of $R_6$ and $R_7$ represents H.

14. A coating composition according to claim 11 wherein $R_3$, $R_4$, $R_6$, and $R_7$ each represents H.

15. A coating composition according to claim 1, further comprising a tin catalyst.

16. A coating composition according to claim 1 wherein the polyisocyanate (b) is blocked with an oxime, an alcohol, or a phenol.

17. A coating composition according to claim 1 wherein the blocked polyisocyanate (b) requires a temperature of at least 141° C. to unblock.

18. A coating composition according to claim 1 wherein the polyisocyanate (b) is an aliphatic polyisocyanate.

19. A coating composition according to claim 18 wherein the polyisocyanate (b) is an isocyanurate.

20. A coating composition according to claim 1 wherein the polyisocyanate (b) has a molecular weight, determined by the GPC method, of from 164 to 1300, exclusive of the blocking group.

21. A coating composition according to claim 1 wherein the polymer (a) has a molecular weight, determined by the GPC method, of from 1500 to 10,000.

22. A coating composition according to claim 21 wherein said polymer is an acrylic, modified acrylic, or polyester.

23. A coating composition according to claim 1 wherein the polymer (a) is an acrylic or modified acrylic polymer.

24. A coating composition according to claim 23 wherein the polymer (a) has a molecular weight, determined by the GPC method, of from 1500 to 10,000.

25. A colorless or clear coating on a substrate, said coating obtained from a coating composition comprising:
(a) an acrylic, modified acrylic, or polyester polymer comprising at least one functional group that is reactive with isocyanate,
(b) a blocked polyisocyanate,
(c) a hydrazide group, either attached to the polymer (a), to the polyisocyanate (b), or part of a compound different from (a) or (b), wherein at least one of the nitrogens of said hydrazide group is not adjacent to a carbonyl.

26. A coating according to claim 25 said colorless or clear coating is the clear layer of a color-plus-clear composite coating.

27. A coating according to claim 26 wherein the colored layer of said color-plus-clear composite coating includes a compound comprising a hydrazide group wherein at least one of the nitrogens of said hydrazide group is not adjacent to a carbonyl.

28. A coating according to claim 25 wherein the substrate is an automotive body panel.

29. A method of applying a colorless or clear coating to a substrate comprising the steps of:
(1) applying a coating composition to the substrate, said composition comprising:
(a) an acrylic, modified acrylic, or polyester polymer comprising at least one functional group that is reactive with isocyanate,
(b) a blocked polyisocyanate,
(c) a hydrazide group, either attached to the polymer (a), to the polyisocyanate (b), or part of a compound different from (a) or (b), wherein at least one of the nitrogens of said hydrazide group is not adjacent to a carbonyl,
(2) curing the coating.

30. A method according to claim 29, further comprising, prior to said applying step, the step of applying a pigmented or colored base coat layer to the substrate.

31. A method according to claim 30 wherein the colored basecoat layer includes a compound comprising a hydrazide group wherein at least one of the nitrogens of said hydrazide group is not adjacent to a carbonyl.

32. A method according to claim 29 wherein said curing step comprises heating the coating to a temperature of at least 141° C.

33. A method according to claim 29 wherein the substrate is an automotive body panel.